(12) United States Patent
Nagaraj et al.

(10) Patent No.: US 11,736,175 B2
(45) Date of Patent: *Aug. 22, 2023

(54) GRID OF BEAMS (GOB) ADAPTATION IN A WIRELESS COMMUNICATIONS CIRCUIT, PARTICULARLY FOR A WIRELESS COMMUNICATIONS SYSTEM (WCS)

(71) Applicant: Corning Research & Development Corporation, Corning, NY (US)

(72) Inventors: Shirish Nagaraj, Pleasanton, CA (US); Deepak Pengoria, Milpitas, CA (US); Jiadong Wang, San Diego, CA (US); Hsien Li Woo, San Diego, CA (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,782

(22) Filed: Apr. 6, 2022

(65) Prior Publication Data

US 2022/0231749 A1    Jul. 21, 2022

Related U.S. Application Data

(63) Continuation of application No. 16/857,164, filed on Apr. 23, 2020, now Pat. No. 11,362,721.

(51) Int. Cl.
H04B 7/06      (2006.01)
H04B 10/2575   (2013.01)
H04B 17/318    (2015.01)

(52) U.S. Cl.
CPC ........ *H04B 7/0695* (2013.01); *H04B 7/0617* (2013.01); *H04B 10/25759* (2013.01); *H04B 17/318* (2015.01)

(58) Field of Classification Search
CPC ........... H04B 7/0695; H04B 10/25759; H04B 17/318; H04B 7/0617
See application file for complete search history.

(56) References Cited

U.S. PATENT DOCUMENTS

| | | |
|---|---|---|
| 5,630,154 A | 5/1997 | Bolstad et al. |
| 9,042,276 B1 | 5/2015 | Harel et al. |
| 9,960,825 B2 | 5/2018 | Petersson et al. |

(Continued)

*Primary Examiner* — Brenda H Pham
(74) *Attorney, Agent, or Firm* — William D. Doyle

(57) ABSTRACT

Grid of beams (GoB) adaptation in a wireless communications circuit, particularly for a wireless communications system (WCS), is disclosed. The wireless communications circuit may be provided in the WCS to provide radio frequency (RF) coverage in a wireless communications cell. In this regard, an antenna array is provided in the wireless communications circuit to radiate the GoB, which includes a number of RF beams corresponding to an RF communications signal(s), in the wireless communications cell. In examples discussed herein, the wireless communications circuit can be configured to detect a coverage condition change in the wireless communications cell and modify the GoB accordingly. By adapting the GoB to the coverage condition change, it may be possible to reduce processing overhead and improve resource usage, data throughput, and system adaptability of the wireless communications circuit, thus helping to optimize RF coverage in the wireless communications cell.

17 Claims, 10 Drawing Sheets

(56) References Cited

U.S. PATENT DOCUMENTS

| | | | |
|---|---|---|---|
| 10,756,429 | B1 | 8/2020 | Marupaduga et al. |
| 11,362,721 | B2 * | 6/2022 | Nagaraj ............ H04B 10/25759 |
| 2006/0133535 | A1 | 6/2006 | Jung et al. |
| 2007/0099578 | A1 | 5/2007 | Adeney et al. |
| 2010/0273499 | A1 | 10/2010 | Van et al. |
| 2011/0305164 | A1 | 12/2011 | Zhang et al. |
| 2014/0327576 | A1 | 11/2014 | Kumar |
| 2016/0087705 | A1 | 3/2016 | Guey et al. |
| 2016/0103199 | A1 | 4/2016 | Rappaport |
| 2016/0191124 | A1 | 6/2016 | Kim |
| 2018/0115354 | A1 | 4/2018 | Athley et al. |
| 2019/0237874 | A1 | 8/2019 | Michaelis et al. |
| 2021/0076228 | A1 | 3/2021 | Han |

* cited by examiner

GRID OF BEAMS (GOB) ADAPTATION IN A WIRELESS COMMUNICATIONS CIRCUIT, PARTICULARLY FOR A WIRELESS COMMUNICATIONS SYSTEM (WCS)

CROSS-REFERENCE TO RELATED APPLICATIONS

This application is a continuation of U.S. patent application Ser. No. 16/857,164, filed Apr. 23, 2020, the content of which is relied upon and incorporated herein by reference in its entirety, and the benefit of priority under 35 U.S.C. § 120 is hereby claimed.

BACKGROUND

The disclosure relates generally to a wireless communications apparatus(es), such as a remote unit(s), a remote radio head(s), or a mobile device(s), particularly in a wireless communications system (WCS), such as a distributed communications system (DCS), a small cell radio access network (RAN), or a distributed antenna system (DAS), configured to support radio frequency (RF) beamforming.

Wireless customers are increasingly demanding wireless communications services, such as cellular communications services and Wireless Fidelity (Wi-Fi) services. Thus, small cells, and more recently Wi-Fi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of DCSs as WCSs, such as a small cell RAN or DAS. DCSs include a central unit or node that is configured to transmit or distribute communications signals to remote units typically over physical medium, such as electrical conductors or optical fiber. The remote units are configured to receive and distribute such communications signals to client devices within the antenna range of the remote unit. DCSs can be particularly useful when deployed inside buildings or other indoor environments where the wireless communications devices may not otherwise be able to effectively receive RF signals from a source.

In this regard, FIG. 1 illustrates a DCS 100 that is configured to distribute communications services to remote coverage areas 102(1)-102(N), where 'N' is the number of remote coverage areas. The DCS 100 in FIG. 1 is provided in the form of a wireless DCS, such as a DAS 104 in this example. The DAS 104 can be configured to support a variety of communications services that can include cellular communications services, wireless communications services, such as RF identification (RFID) tracking, Wi-Fi, local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on remote units 106(1)-106(N) connected to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this example, the central unit 108 receives downlink communications signals 112D from the source transceiver 110 to be distributed to the remote units 106(1)-106(N). The downlink communications signals 112D can include data communications signals and/or communications signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over the communications link 114. The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. The remote units 106(1)-106(N) may include RF transmitter/receiver circuits 116(1)-116(N) and antennas 118(1)-118(N), respectively. The antennas 118(1)-118(N) are operably connected to the RF transmitter/receiver circuits 116(1)-116(N) to wirelessly distribute the communications services to user equipment (UE) 120 within the respective remote coverage areas 102(1)-102(N). The remote units 106(1)-106(N) are also configured to receive uplink communications signals 112U from the UE 120 in the respective remote coverage areas 102(1)-102(N) to be distributed to the source transceiver 110.

Conventionally, the remote units 106(1)-106(N) may be configured to communicate the downlink communications signals 112D and the uplink communications signals 112U with the UE 120 based on a third-generation (3G) wireless communication technology, such as wideband code-division multiple access (WCDMA), and/or a fourth-generation (4G) wireless communication technology, such as long-term evolution (LTE). As wireless communication technology continues to evolve, a new fifth-generation (5G) new-radio (NR) (5G-NR) wireless communication technology has emerged as a next generation wireless communication technology having the potential of achieving significant improvement in data throughput, coverage range, signal efficiency, and access latency over the existing 3G and 4G wireless communication technologies. As such, it may be necessary to upgrade or reconfigure the remote units 106(1)-106(N) to communicate the downlink communications signals 112D and the uplink communications signals 112U with the UE 120 based on the 5G-NR wireless communication technologies.

The 5G-NR wireless communication technology may be implemented based on a millimeter-wave (mmWave) spectrum that is typically higher than 6 GHz, which makes the downlink communications signals 112D and the uplink communications signals 112U more susceptible to propagation loss. As such, RF beamforming has become a core ingredient of the 5G-NR wireless communication technology to help mitigate signal propagation loss in the mmWave spectrum. In this regard, the antennas 118(1)-118(N) may be replaced by an equal number of antenna arrays (not shown) each including multiple antennas (e.g., 4×4, 8×8, 16×16, etc.). Accordingly, the remote units 106(1)-106(N) may be configured to communicate the downlink communications signals 112D and the uplink communications signals 112U by forming and steering RF beams 122(1)-122(N) toward the UE 120. By forming and steering the RF beams 122(1)-122(N) toward the UE 120, the remote units 106(1)-106(N) may communicate the downlink communications signals 112D and the uplink communications signals 112U with higher equivalent isotropically radiated power (EIRP) and signal-to-interference-plus-noise ratio (SINR), thus helping to mitigate the propagation loss in the mmWave spectrum.

No admission is made that any reference cited herein constitutes prior art. Applicant expressly reserves the right to challenge the accuracy and pertinency of any cited documents.

SUMMARY

Embodiments disclosed herein include grid of beams (GoB) adaptation in a wireless communications circuit, particularly for a wireless communications system (WCS). The wireless communications circuit may be provided in the WCS to provide radio frequency (RF) coverage in a wireless communications cell (e.g., an indoor small cell). In this regard, an antenna array is provided in the wireless communications circuit to radiate the GoB, which includes a number of RF beams corresponding to an RF communications signal(s), in the wireless communications cell. In examples discussed herein, the wireless communications circuit can be configured to detect a coverage condition change (e.g., user density, building layout, throughput requirement, etc.) in the wireless communications cell and modify the GoB accordingly. By adapting the GoB to the coverage condition change, it may be possible to reduce processing overhead and improve resource usage, data throughput, and system adaptability of the wireless communications circuit, thus helping to optimize RF coverage in the wireless communications cell.

One exemplary embodiment of the disclosure relates to a wireless communications circuit. The wireless communications circuit includes an antenna array comprising a plurality of radiating elements configured to radiate a GoB comprising a plurality of RF beams corresponding to an RF communications signal in a wireless communications cell. The wireless communications circuit also includes a control circuit. The control circuit is configured to receive an indication signal indicative of a coverage condition change in the wireless communications cell. The control circuit is also configured to cause the antenna array to modify the GoB in response to the coverage condition change in the wireless communications cell.

An additional exemplary embodiment of the disclosure relates to a method for adapting a GoB in a wireless communications circuit. The method includes radiating a GoB comprising a plurality of RF beams corresponding to an RF communications signal in a wireless communications cell. The method also includes receiving an indication signal indicative of a coverage condition change in the wireless communications cell. The method also includes modifying the GoB in response to the coverage condition change in the wireless communications cell.

An additional exemplary embodiment of the disclosure relates to a WCS. The WCS includes a central unit. The WCS also includes a plurality of remote units coupled to the central unit via a plurality of communications mediums. The plurality of remote units is configured to receive a plurality of downlink digital communications signals from the central unit via the plurality of communications mediums, respectively. The plurality of remote units is also configured to convert the plurality of downlink digital communications signals into a plurality of downlink RF communications signals, respectively. The plurality of remote units is also configured to distribute the plurality of downlink RF communications signals, respectively. The plurality of remote units is also configured to receive a plurality of uplink RF communications signals, respectively. The plurality of remote units is also configured to convert the plurality of uplink RF communications signals into a plurality of uplink digital communications signals, respectively. The plurality of remote units is configured to provide the plurality of uplink digital communications signals to the central unit via the plurality of communications mediums, respectively. At least one remote unit among the plurality of remote units includes an antenna array comprising a plurality of radiating elements configured to radiate a GoB comprising a plurality of RF beams corresponding to an RF communications signal among the plurality of downlink RF communications signals in a wireless communications cell. The at least one remote unit also includes a control circuit. The control circuit is configured to receive an indication signal indicative of a coverage condition change in the wireless communications cell. The control circuit is also configured to cause the antenna array to modify the GoB in response to the coverage condition change in the wireless communications cell.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description to explain principles and operation of the various embodiments.

DETAILED DESCRIPTION

Embodiments disclosed herein include grid of beams (GoB) adaptation in a wireless communications circuit, particularly for a wireless communications system (WCS). The wireless communications circuit may be provided in the WCS to provide radio frequency (RF) coverage in a wireless communications cell (e.g., an indoor small cell). In this regard, an antenna array is provided in the wireless communications circuit to radiate the GoB, which includes a number of RF beams corresponding to an RF communications signal(s), in the wireless communications cell. In examples discussed herein, the wireless communications circuit can be configured to detect a coverage condition change (e.g., user density, building layout, throughput requirement, etc.) in the wireless communications cell and modify the GoB accordingly. By adapting the GoB to the coverage condition change, it may be possible to reduce processing overhead and improve resource usage, data throughput, and system adaptability of the wireless communications circuit, thus helping to optimize RF coverage in the wireless communications cell.

Figure 1:
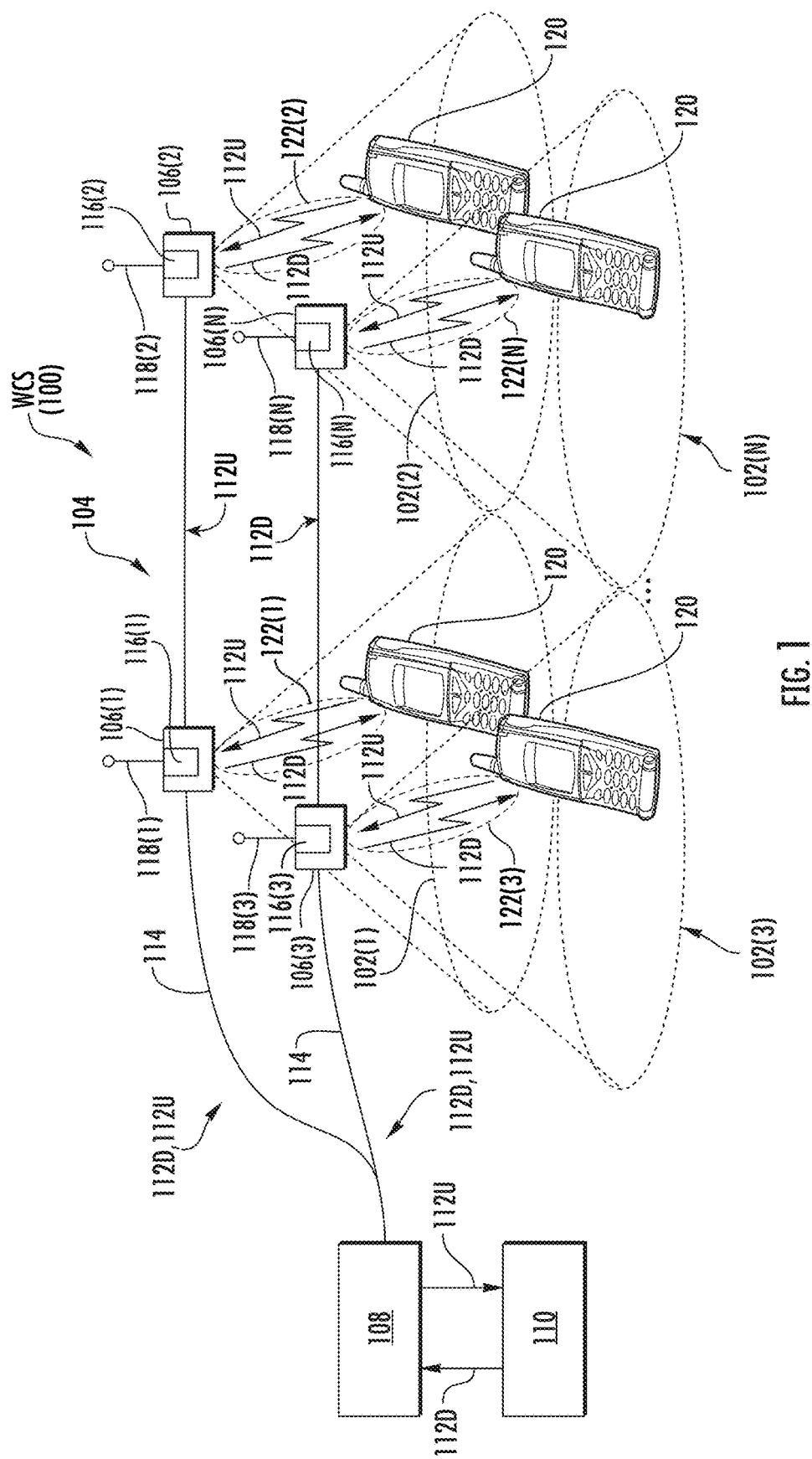
FIG. 1 is a schematic diagram of an exemplary wireless communications system (WCS), such as a distributed communications system (DCS), configured to distribute communications services to remote coverage areas.
Figure 2A:
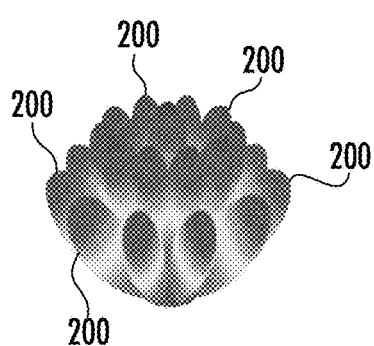
FIGS. 2A-2C are graphic diagrams providing exemplary illustration of a number of fundamental aspects related to radio frequency (RF) beamforming.
Figure 2B:
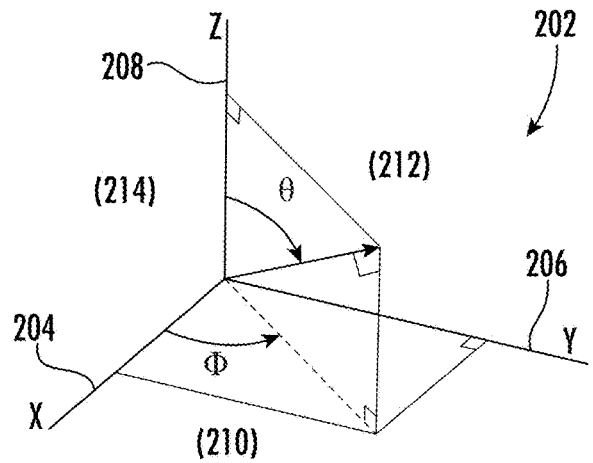
Figure 2C:
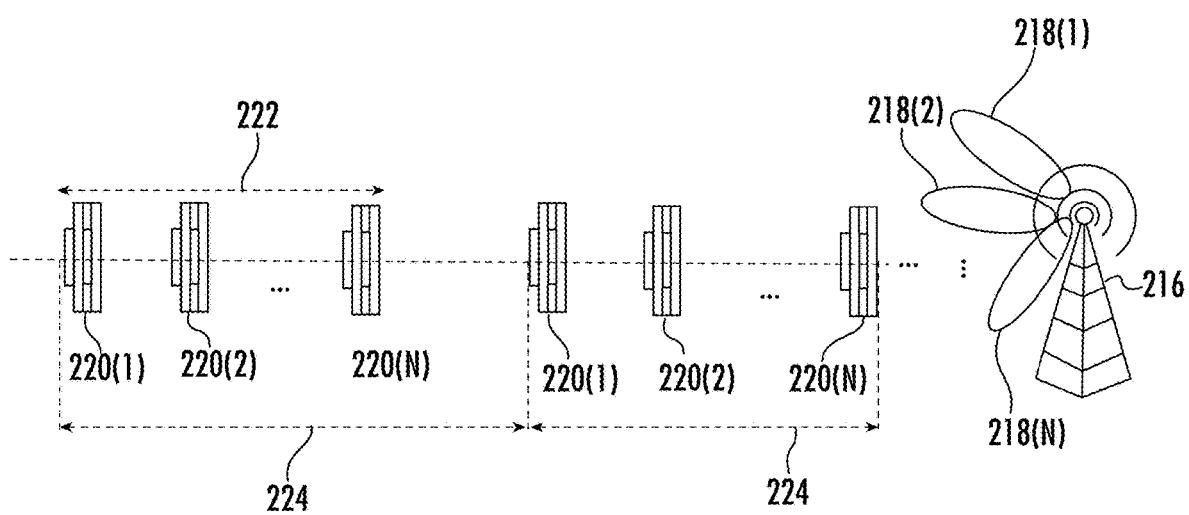
Figure 3:
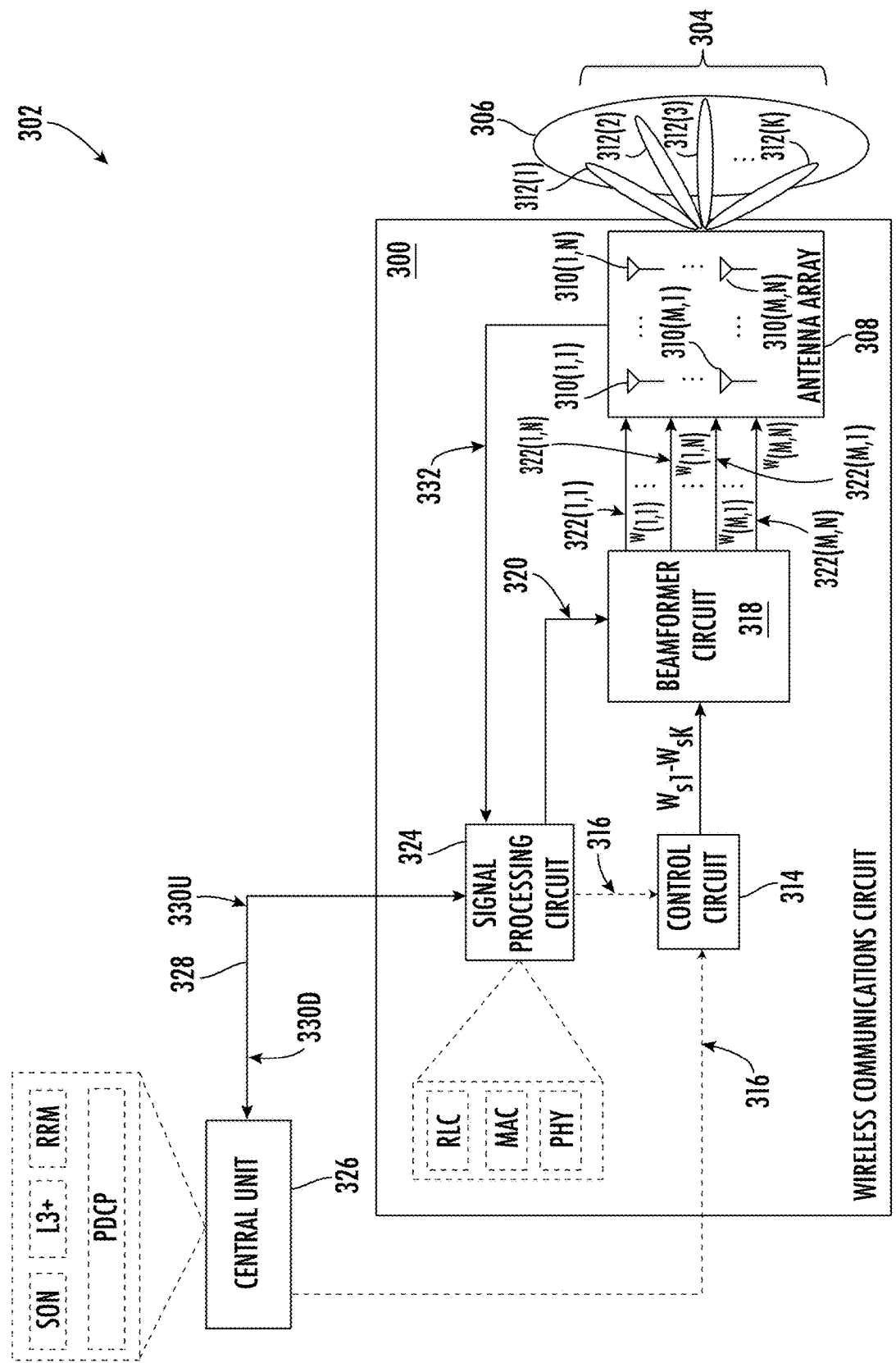
FIG. 3 is a schematic diagram of an exemplary wireless communications circuit provided in a WCS and configured to modify a grid of beams (GoB) radiated in a wireless communications cell in response to a coverage condition change in the wireless communications cell.

Before discussing a wireless communications circuit of the present disclosure configured to adapt a GoB to improve coverage, reduce complexity and latency, and conserve energy, starting at FIG. 3, a brief overview is first provided with reference to FIGS. 2A-2C to help explain some fundamental aspects related to RF beamforming.

FIGS. 2A-2C are graphic diagrams providing exemplary illustrations of a number of fundamental aspects related to RF beamforming. In general, beamforming refers to a technique that uses multiple antennas to simultaneously radiate an RF signal in an RF spectrum, such as a millimeterwave (mmWave) spectrum. The multiple antennas, also called "antenna elements," that are typically organized into an antenna array (e.g., 4×4, 8×8, 16×16, etc.) and separated from each other by at least one-half (½) wavelength. The RF signal is pre-processed based on a beam weight set, which includes multiple beam weights corresponding to the multiple antennas, respectively, to generate multiple weighted RF signals. The multiple weighted RF signals are then coupled to specific antennas in the antenna array for simultaneous radiation in the RF spectrum. As illustrated in FIG. 2A, by pre-processing the RF signal based on multiple beam weight sets, it may be possible to form multiple RF beams 200 pointing to multiple directions radiating from antenna elements in an antenna array, respectively.

Each beam weight in a given beam weight set is a complex weight consisting of a respective phase term and a respective amplitude term. The phase terms in the complex beam weight can be determined to cause the multiple simultaneously radiated RF signals to constructively combine in one direction to form the RF beams 200, while destructively averaging out in other directions. In this regard, the phase term can determine how the RF beams 200 is formed and which direction the RF beams 200 is pointing to. On the other hand, the amplitude terms in the complex beam weight may determine how many of the antennas in the antenna array are utilized to simultaneously radiate the RF signals. Notably, when more antennas are utilized to simultaneously radiate the RF signals, the RF beams 200 will become more concentrated to have a narrower beamwidth and a higher beamformed antenna gain. In contrast, when fewer antennas are utilized to simultaneously radiate the RF signals, the RF beams 200 will become more spreaded to have a wider beamwidth and a lesser beamformed antenna gain. In this regard, the amplitude term can determine the beamwidth of the RF beams 200. In a non-limiting example, a beamwidth refers to a spatial spread of a main lobe containing majority of the radiated power of an RF beam.

FIG. 2B is a graphic diagram of an exemplary spherical coordinate system 202 that helps explain how the complex beam weight can be determined. The spherical coordinate system 202 includes an x-axis (X) 204, a y-axis (Y) 206, and a z-axis (Z) 208. The x-axis 204 and the y-axis 206 collectively define an x-y plane 210, the y-axis 206 and the z-axis 208 collectively define a y-z plane 212, and the x-axis 204 and the z-axis 208 collectively define an x-z plane 214. Depending how the multiple antennas are arranged in the antenna array, a beam weight $w_n$ may be determined based on equations (Eq. 1-Eq. 4) below.

The equation (Eq. 1) below illustrates how a beam weight $w_n$ may be determined when the multiple antennas in the antenna array are arranged linearly along the y-axis 206.

$$w_n = e^{-j2\pi n \cdot \frac{dy}{\lambda} \cdot \sin\theta} \quad (0 \le n \le N-1) \quad \text{(Eq. 1)}$$

In the equation (Eq. 1) above, 'N' represents a total number of the antennas in the antenna array and $\theta$ represents a zenith angle. The equation (Eq. 2) below illustrates how the a beam weight $w_{m,n}$ may be determined when the multiple antennas in the antenna array are arranged in an M×N matrix in the x-y plane 210 in FIG. 2B.

$$w_{m,n} = e^{-j2\pi m \cdot \frac{dx}{\lambda} \cdot \sin\theta\cos\phi} e^{-j2\pi n \cdot \frac{dy}{\lambda} \cdot \sin\theta\sin\phi} \quad (0 \le m \le M-1, 0 \le n \le N-1) \quad \text{(Eq. 2)}$$

In the equation (Eq. 2) above, 'M' and 'N' represent the number of rows and the number of columns of M×N matrix, respectively, and φ represents an azimuth angle. The equation (Eq. 3) below illustrates how the a beam weight $w_{m,n}$ may be determined when the multiple antennas in the antenna array are arranged in an M×N matrix in the y-z plane 212 in FIG. 2B.

$$w_{m,n} = e^{-j2\pi m \cdot \frac{dz}{\lambda} \cdot \cos\theta} e^{-j2\pi n \cdot \frac{dy}{\lambda} \cdot \sin\theta \sin\phi} (0 \le m \le M-1, 0 \le n \le N-1) \quad \text{(Eq. 3)}$$

The equation (Eq. 4) below illustrates how the a beam weight $w_{m,n}$ may be determined when the multiple antennas in the antenna array are arranged in an M×N matrix in the x-z plane 214 in FIG. 2B.

$$w_{m,n} = e^{-j2\pi m \cdot \frac{dx}{\lambda} \cdot \sin\theta \cos\phi} e^{-j2\pi n \cdot \frac{dz}{\lambda} \cdot \cos\theta} \ (0 \le m \le M-1, 0 \le n \le N-1) \quad \text{(Eq. 4)}$$

Although it may be possible for the antennas in the antenna array to form the multiple RF beams 200 in FIG. 2A in the multiple directions, an actual number of the RF beams 200 is typically limited by a standard-defined parameter known as the synchronization signal block (SSB), which is further discussed next in FIG. 2C. In this regard, FIG. 2C is a graphic diagram providing an exemplary illustration on how the SSB limits the actual number the RF beams 200 that may be formed by the antennas in the antenna array.

In conventional wireless systems, such as the third-generation (3G) and the fourth-generation (4G) wireless systems, a basestation is typically configured to radiate a cell-wide reference signal omnidirectionally to enable cell discovery and coverage measurement by an user equipment (UE). However, a fifth-generation new-radio (5G-NR) wireless system does not provide the cell-wide reference signal. Instead, as shown in FIG. 2C, a 5G-NR gNB 216 is configured to radiate a number of reference beams 218(1)-218(N) in different directions of a 5G-NR coverage cell. The reference beams 218(1)-218(N) are associated with a number of SSBs 220(1)-220(N), respectively. Each of SSBs 220(1)-220(N) may include primary synchronization signal (PSS), secondary synchronization signal (SSS), and 5G-NR physical broadcast channel (PBCH).

In this regard, a 5G-NR UE in the 5G-NR coverage cell can sweep through the reference beams 218(1)-218(N) to identify a candidate reference beam(s) associated with a strongest reference signal received power (RSRP). Further, the 5G-NR UE may decode a candidate SSB(s) associated with the identified candidate reference beam(s) to acquire such information as physical cell identification (PCI) and PBCH demodulation reference signal (DMRS). Based on the candidate reference beam(s) reported by the 5G-NR UE, the 5G-NR gNB 216 may pinpoint location of the 5G-NR UE and steer a data-bearing RF beam toward the 5G-NR UE to enable data communication with the 5G-NR UE.

The SSBs 220(1)-220(N) may be organized into an SSB burst set 222 to be repeated periodically in a number of SSB burst periods 224. The SSB burst set 222 may be five-millisecond (5 ms) in duration and the SSB burst periods 224 may repeat every twenty milliseconds (20 ms). The beamforming standard, as presently defined by the third-generation partnership project (3GPP), allows a maximum of 64 SSBs to be scheduled in the SSB burst set 222. Accordingly, the 5G-NR gNB 216 can radiate 64 reference beams 218(1)-218(N) in each of the SSB burst periods 224.

Understandably, the 5G-NR gNB 216 will be able to maximize coverage in the 5G-NR coverage cell by radiating the maximum number (e.g., 64) of the reference beams 218(1)-218(N) in each of the SSB burst periods 224. However, radiating the maximum number of the reference beams 218(1)-218(N) can introduce significant overhead in terms of computational complexity and processing delay. As such, it may be desirable to maximize coverage in the 5G-NR coverage cell by radiating as lesser number of the reference beams 218(1)-218(N) as possible.

Furthermore, the 5G-NR gNB 216 may be configured to operate in an indoor environment (e.g., an office building, an indoor stadium, etc.) of an indoor communications system. The 5G-NR gNB 216 may initially be installed and configured based on a deployment plan developed based on some generic assumptions of the coverage condition, such as office layout, user density, throughput requirement, and so on. However, the coverage condition may have changed, either suddenly or gradually, since the 5G-NR gNB 216 was installed, which may have invalidated some of the initial assumptions. As such, it may also be desirable to dynamically reconfigure the 5G-NR gNB 216 in response to the change in the coverage condition.

In this regard, FIG. 3 is a schematic diagram of an exemplary wireless communications circuit 300 provided in a WCS 302 and configured to modify a GoB 304 radiated in a wireless communications cell 306 in response to a coverage condition change in the wireless communications cell 306. In a non-limiting example, the coverage condition change refers to a change in configuration and/or operating status (e.g., user density, building layout, throughput requirement, etc.) in the WCS 302 relative to a previously known status. The wireless communications circuit 300, which can be configured to function as a remote node (RN) or a remote unit (RU) in the WCS 302, includes an antenna array 308. The antenna array 308 includes a plurality of radiating elements 310(1,1)-310(M,N), which can be any type of antennas, as an example. The radiating elements 310(1,1)-310(M,N) are configured to radiate a plurality of RF beams 312(1)-312(K) that collectively form the GoB 304 to provide RF coverage in the wireless communications cell 306.

Figure 4C:
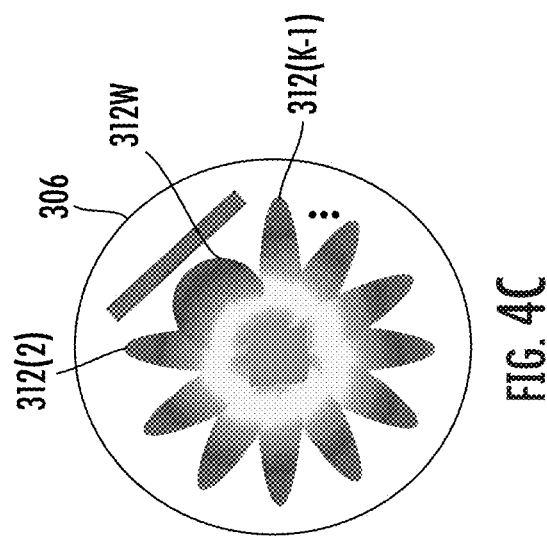
FIGS. 4A-4C are graphic diagrams providing exemplary illustrations of how the wireless communications circuit of FIG. 3 modifies the GoB in response to the coverage condition change in the wireless communications cell.
Figure 4A:
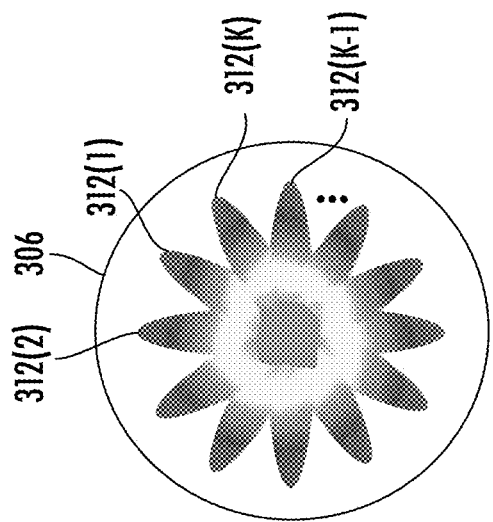
Figure 4B:
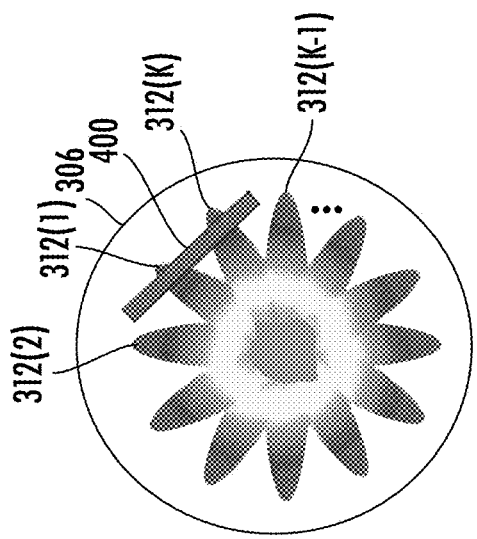

The wireless communications circuit 300 may be initially deployed in the WCS 302 based on an initial configuration plan of the wireless communications cell 306. For example, FIG. 4A is a schematic diagram providing an exemplary illustration of the initial configuration plan, which may have assumed that there is no obstacle in the wireless communications cell 306. Accordingly, the wireless communications circuit 300 may be been configured to radiate the RF beams 312(1)-312(K) with an identical beamwidth. However, the initial configuration plan may have not taken into consideration specific environmental and/or usage condications of the wireless communications cell 306. For example, FIG. 4B is a schematic diagram providing an exemplary illustration of the initial configuration plan, which has not accounted for a wall 400 in the radiation paths of the RF beams 312(1) and 312(K). As a result, the RF beams 312(1) and 312(K) may have been formed with excessive beamforming antenna gain, thus causing a waste of energy in the wireless communications cell 306. In this regard, the coverage condition in the wireless communications cell 306 is said to have changed with respect to the initial configuration plan.

The wireless communications circuit 300 can be configured to dynamically modify the GoB 304 in response to the coverage condition change in the wireless communications cell 306. In a non-limiting example, FIG. 4C is a schematic diagram providing an exemplary illustration of the wireless communications circuit 300, which can combine the narrower RF beams 312(1) and 312(K) in FIG. 4B to form a wider RF beam 312W with a wider beamwidth in FIG. 4C. The wider RF beam 312W will have a reduced beamforming antenna gain compared to the narrower RF beams 312(1) and 312(K), thus helping to reduce energy waste in the wireless communications cell 306. Alternative to combining the narrower RF beams 312(1) and 312(K) into the wider RF beam 312W, the wireless communications circuit 300 may also change the beamwidth of the narrower RF beam 312(1) and terminate the narrower RF beam 312(K).

Notably, the scenario illustrated in FIGS. 4A-4C is merely one of the many possibilities that can cause the coverage condition change. In another non-limiting example, the wireless communications circuit 300 may have been deployed based on an initial estimate of user density that has either increased or decreased over time, thus demanding the wireless communications circuit 300 to modify the GoB 304 to increase or decrease signal bandwidth and/or data throughput in the wireless communications cell 306.

In this regard, the wireless communications circuit 300 can be configured to dynamically modify the GoB 304 in response to any type of the coverage condition change. In a non-limiting example, the wireless communications circuit 300 includes a control circuit 314, which can be a field-programmable gate array (FPGA), as an example. The control circuit 314 may be configured to receive an indication signal 316 indicative of the coverage condition change and cause the antenna array 308 to modify the GoB 304 in response to receiving the indication signal 316. By dynamically modifying the GoB 304 based on the coverage condition change, it may be possible to reduce processing and improve resource usage, data throughput, and system adaptability of the wireless communications circuit 300, thus helping to optimize RF coverage in the wireless communications cell 306.

The control circuit 314 is configured to generate a plurality of beam weight sets $W_{s1}$-$W_{sK}$ corresponding to the RF beams 312(1)-312(K), respectively. Each of the beam weight sets $W_{s1}$-$W_{sK}$ includes a plurality of beam weights $w_{(1,1)}$-$w_{(M,N)}$ that corresponds to the radiating elements 310(1,1)-310(M,N) in the antenna array 308. As explained earlier in FIGS. 2A-2B, each of the beam weights $W_{(1,1)}$-$W_{(M,N)}$ in each of the beam weight sets $W_{s1}$-$W_{sK}$ is a complex weight (A, θ, φ) consisting of a respective amplitude term A and a respective phase term (θ, φ). The phase terms (θ, φ) in the beam weight sets $W_{s1}$-$W_{sK}$ can collectively cause each of the RF beams 312(1)-312(K) to be formed in a respective direction. The amplitude terms A in each of the beam weight sets $W_{s1}$-$W_{sK}$ can determine how many of the radiating elements 310(1,1)-310(M,N) are used to form each of the RF beams 312(1)-312(K) and thus a respective beamwidth of each of the RF beams 312(1)-312(K). In this regard, the control circuit 314 may cause the antenna array 308 to modify the GoB 304 by modifying at least one selected beam weight set $W_{s1}$-$W_{sK}$ in response to the coverage condition change.

The wireless communications circuit 300 can include a beamformer circuit 318, which can be implemented by a system-on-chip (SoC), as an example. The beamformer circuit 318 is configured to receive the beam weight sets $W_{s1}$-$W_{sK}$ from the control circuit 314. The beamformer circuit 318 can be configured to receive and process an RF communications signal 320 based on the beam weights $w_{(1,1)}$-$w_{(M,N)}$ in each of the beam weight sets $W_{s1}$-$W_{sK}$ to generate a plurality of weighted RF communications signals 322(1,1)-322(M,N). The radiating elements 310(1,1)-310(M,N) in the antenna array 308 are configured to radiate the weighted RF communications signals 322(1,1)-322(M,N) simultaneously to form a respective RF beam among the RF beams 312(1)-312(K) that corresponds to a respective beam weight set among the beam weight sets $W_{s1}$-$W_{sK}$. In this regard, the beamformer circuit 318 is configured to generate a total of 'K' sets of the weighted RF communications signals 322(1,1)-322(M,N) for forming and/or modifying the RF beams 312(1)-312(K), respectively.

The wireless communications circuit 300 may be configured to include a signal processing circuit 324, which can be an FPGA, as an example, configured to provide the RF communications signal 320 to the beamformer circuit 318. The signal processing circuit 324 may be provided in a separate circuit from the control circuit 314 or integrated with the control circuit 314 in a same circuit. The signal processing circuit 324 may be coupled to a central unit 326 via a communications medium 328 (e.g., an optical fiber-based communications medium). Notably, the central unit 326 can be provided in a different location (e.g., different room, floor, or building) from the location of the wireless communications circuit 300. In this regard, the central unit 326 and the wireless communications circuit 300 correspond to different entities in the WCS 302.

The signal processing circuit 324 is configured to receive a downlink digital communications signal 330D from the central unit 326 and generate the RF communications signal 320 based on the downlink digital communications signal 330D. The signal processing circuit 324 is also configured to receive an uplink RF communications signal 332 via the antenna array 308. The signal processing circuit 324 is configured to generate an uplink digital communications signal 330U based on the uplink RF communications signal 332 and provide the uplink digital communications signal 330U to the central unit 326 via the communications medium 328.

The signal processing circuit 324 and the central unit 326 may be configured to carry out different networking functions. For example, the signal processing circuit 324 can be configured to implement such lower layer networking protocols as physical (PHY), medium access control (MAC), and radio link control (RLC) protocols. The central unit 326, on the other hand, may be configured to implement such higher layer networking protocols as packet data convergence protocol (PDCP), radio resource management (RRM), above layer-3 (L3+) protocols such as transport control protocol (TCP) and internet protocol (IP), and self-organizing network (SON) protocols.

In one embodiment, the signal processing circuit 324 may be configured to determine the coverage condition change in the wireless communications cell 306 based on one or more coverage indication parameters and generate the indication signal 316 accordingly. In a non-limiting example, the coverage indication parameters can include a reference signal received power (RSRP) measurement(s) reported by a UE(s) in the wireless communications cell 306 (e.g., along with the uplink RF communications signal 332), a UE count in the wireless communications cell 306, a resource usage indicator (e.g., resource block (RB) usage), and/or a UE timing advance indication. The RSRP measurement(s) may help determine whether a selected RF beam(s) among the RF beams 312(1)-312(K) has excessive beamforming antenna gain. The UE count and/or the resource usage indicator may help determine how efficiently the resources are used in the wireless communications cell 306 and whether more resources are required to increase throughput in the wireless communications cell 306. The UE timing advance indicator may help determine a distance(s) between a UE(s) in the wireless communications cell 306 and the antenna array 308. The signal processing circuit 324 may be configured to retrieve some or all of the coverage indication parameters (e.g., the UE count, the resource usage indicator, and/or the UE timing advance indicator) from the central unit 326.

In another embodiment, the central unit 326 may be configured to determine the coverage condition change in the wireless communications cell 306 based on the coverage indication parameters, as described above, and generate the indication signal 316 accordingly. The central unit 326 may be configured to execute an adaptive GoB optimization algorithm to determine the coverage condition change and generate the indication signal 316 indicative of the coverage condition change. The central unit 326 may be further configured to provide beamforming instructions to the control circuit 314 to cause the control circuit 324 to modify the selected the beam weight sets $W_{s1}$-$W_{sK}$ in response to the coverage condition change. The central unit 326 may be configured to retrieve some or all of the coverage indication parameters from the signal processing circuit 324.

In another embodiment, both the signal processing circuit 324 and the central unit 326 may be configured to generate and provide the indication signal 316 to the control circuit 314. For example, the signal processing circuit 324 can generate the indication signal 316 based on a shorter-term (e.g., a minute or an hour) coverage condition change in a particular wireless communications cell, while the central unit 326 is configured to generate the indication signal 316 based on a longer-term (e.g., a day or a week) coverage condition change in one or more wireless communications cells. In this regard, the control circuit 314 may be configured to determine how the GoB 304 is modified based on the indication signal 316 received from the signal processing circuit 324 and/or the indication signal 316 received from the central unit 326. It should be appreciated that the control circuit 314 may be configured to receive the indication signal 316 from other entities (e.g., a neighboring wireless communications circuit in the WCS 302) as well.

Figure 5:
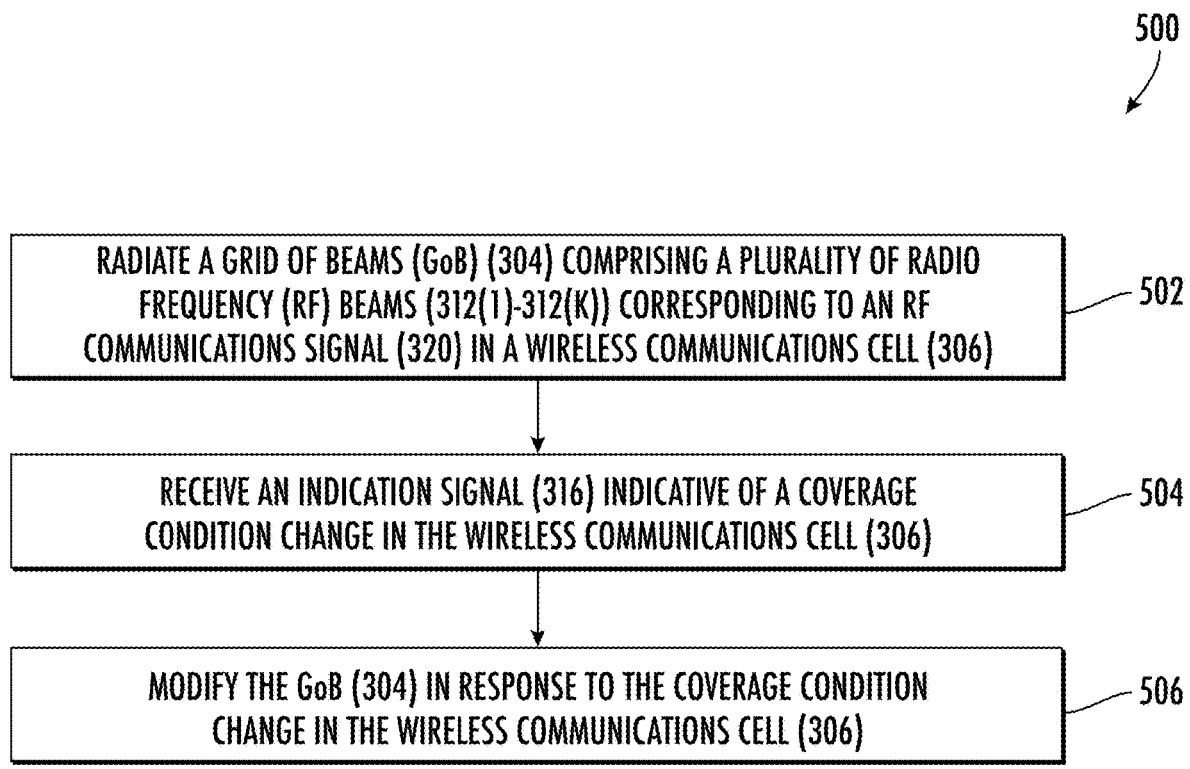
FIG. 5 is a flowchart of an exemplary process that can be employed by the wireless communications circuit of FIG. 3 to modify the GoB in response to the coverage condition change in the wireless communications cell.

The wireless communications circuit 300 may be configured to adapt the GoB 304 in response to the coverage condition change in the wireless communications cell 306 based on a process. In this regard, FIG. 5 is a flowchart of an exemplary process 500 that can be employed by the wireless communications circuit 300 of FIG. 3 to modify the GoB 304 in response to the coverage condition change in the wireless communications cell 306.

With reference to the process 500, the antenna array 308 is configured to radiate the GoB 304, which includes the RF beams 312(1)-312(K) corresponding to the RF communications signal 320, in the wireless communications cell 306 (block 502). The control circuit 314 receives the indication signal 316 indicative of the coverage condition change in the wireless communications cell 306 (block 504). Accordingly, the control circuit 314 is configured to cause the antenna array 308 to modify the GoB 304 in response to the coverage condition change in the wireless communications cell 306 (block 506).

Figure 6:
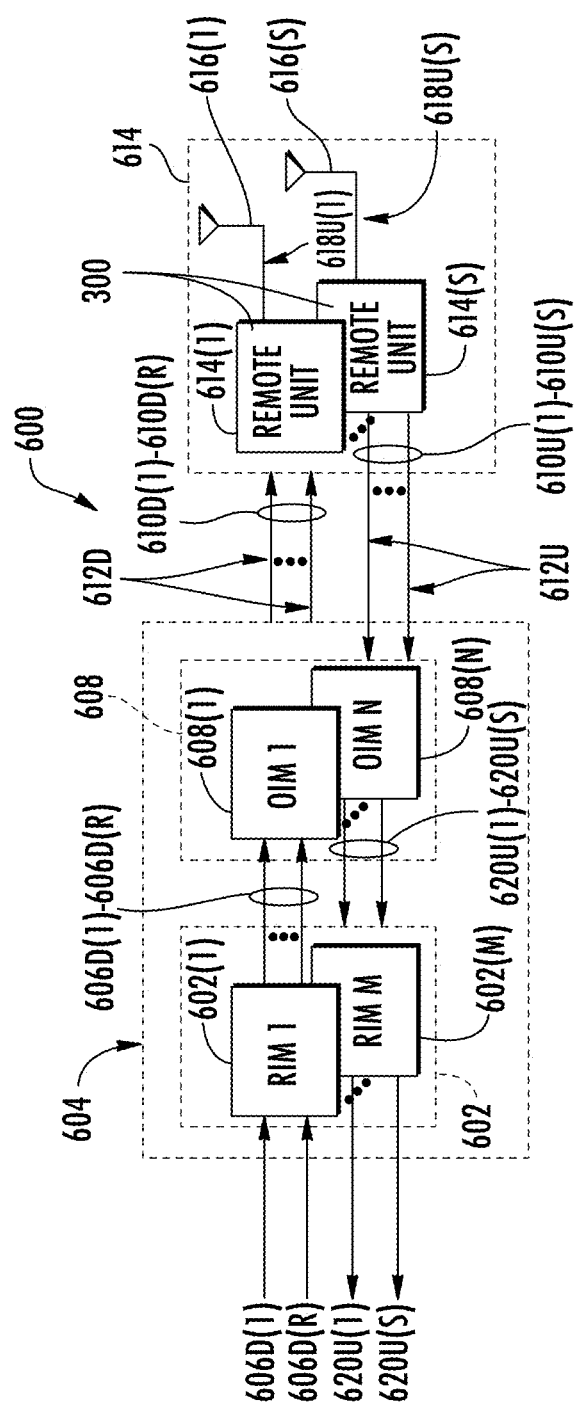
FIG. 6 is a schematic diagram of an exemplary WCS provided in the form of an optical fiber-based WDS that is configured to include the wireless communications circuit of FIG. 3 to modify the GoB in response to the coverage condition change in the wireless communications cell.

FIG. 6 is a schematic diagram an exemplary WCS 600 provided in the form of an optical fiber-based WDS 600 that can include a plurality of remote units, which can incorporate the wireless communications circuit 300 of FIG. 3 to modify the GoB 304 in response to the coverage condition change in the wireless communications cell 306. The WCS 600 includes an optical fiber for distributing communications services for multiple frequency bands. The WCS 600 in this example is comprised of three (3) main components.

A plurality of radio interfaces provided in the form of radio interface modules (RIMs) 602(1)-602(M) are provided in a central unit 604 to receive and process a plurality of downlink digital communications signals 606D(1)-606D(R) prior to optical conversion into downlink optical fiber-based communications signals. The downlink digital communications signals 606D(1)-606D(R) may be received from a base station or a baseband unit as an example. The RIMs 602(1)-602(M) provide both downlink and uplink interfaces for signal processing. The notations "1-R" and "1-M" indicate that any number of the referenced component, 1-R and 1-M, respectively, may be provided. The central unit 604 is configured to accept the RIMS 602(1)-602(M) as modular components that can easily be installed and removed or replaced in the central unit 604. In one example, the central unit 604 is configured to support up to twelve (12) RIMs 602(1)-602(12). Each of the RIMS 602(1)-602(M) can be designed to support a particular type of radio source or range of radio sources (i.e., frequencies) to provide flexibility in configuring the central unit 604 and the WCS 600 to support the desired radio sources.

For example, one RIM 602 may be configured to support the Personalized Communications System (PCS) radio band. Another RIM 602 may be configured to support the 800 megahertz (MHz) radio band. In this example, by inclusion of the RIMS 602(1)-602(M), the central unit 604 could be configured to support and distribute communications signals on both PCS and Long-Term Evolution (LTE) 700 radio bands, as an example. The RIMs 602(1)-602(M) may be provided in the central unit 604 that support any frequency bands desired, including, but not limited to, the US Cellular band, PCS band, Advanced Wireless Service (AWS) band, 700 MHz band, Global System for Mobile communications (GSM) 900, GSM 1800, and Universal Mobile Telecommunications System (UMTS). The RIMS 602(1)-602(M) may also be provided in the central unit 604 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 602(1)-602(M) may be provided in the central unit 604 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 6, the downlink digital communications signals 606D(1)-606D(R) are provided to a plurality of optical interfaces provided in the form of optical interface modules (OIMs) 608(1)-608(N) in this embodiment to convert the downlink digital communications signals 606D(1)-606D(R) into a plurality of downlink optical fiber-based communications signals 610D(1)-610D(R). The notation "1-N" indicates that any number of the referenced component 1-N may be provided. The OIMs 608(1)-608(N) may be configured to provide a plurality of optical interface components (OICs) that contain optical-to-electrical (O/E) and electrical-to-optical (E/O) converters, as will be described in more detail below. The OIMs 608(1)-608(N) support the radio bands that can be provided by the RIMs 602(1)-602(M), including the examples previously described above.

The OIMs 608(1)-608(N) each include E/O converters to convert the downlink digital communications signals 606D(1)-606D(R) into the downlink optical fiber-based communications signals 610D(1)-610D(R). The downlink optical fiber-based communications signals 610D(1)-610D(R) are communicated over a downlink optical fiber-based communications medium 612D to a plurality of remote units 614(1)-614(S). At least one selected remote unit among the remote units 614(1)-614(S) can be configured to function as the wireless communications circuit 300 of FIG. 3. The notation "1-S" indicates that any number of the referenced component 1-S may be provided. Remote unit O/E converters provided in the remote units 614(1)-614(S) convert the downlink optical fiber-based communications signals 610D(1)-610D(R) back into the downlink digital communications signals 606D(1)-606D(R), which are the converted into a plurality of downlink RF communications signals and provided to antennas 616(1)-616(S) in the remote units 614(1)-614(S) to client devices in the reception range of the antennas 616(1)-616(S).

The remote units 614(1)-614(S) receive a plurality of uplink RF communications signals from the client devices through the antennas 616(1)-616(S). The remote units 614(1)-614(S) convert the uplink RF communications signals 618U(1)-618U(S) into a plurality of uplink digital communications signals 618U(1)-618U(S). Remote unit E/O converters are also provided in the remote units 614(1)-614(S) to convert the uplink digital communications signals 618U(1)-618U(S) into a plurality of uplink optical fiber-based communications signals 610U(1)-610U(S). The remote units 614(1)-614(S) communicate the uplink optical fiber-based communications signals 610U(1)-610U(S) over an uplink optical fiber-based communications medium 612U to the OIMs 608(1)-608(N) in the central unit 604. The OIMs 608(1)-608(N) include O/E converters that convert the received uplink optical fiber-based communications signals 610U(1)-610U(S) into a plurality of uplink digital communications signals 620U(1)-620U(S), which are processed by the RIMs 602(1)-602(M) and provided as the uplink digital communications signals 620U(1)-620U(S). The central unit 604 may provide the uplink digital communications signals 620U(1)-620U(S) to a base station or other communications system.

Note that the downlink optical fiber-based communications medium 612D and the uplink optical fiber-based communications medium 612U connected to each of the remote units 614(1)-614(S) may be a common optical fiber-based communications medium, wherein for example, wave division multiplexing (WDM) is employed to provide the downlink optical fiber-based communications signals 610D(1)-610D(R) and the uplink optical fiber-based communications signals 610U(1)-610U(S) on the same optical fiber-based communications medium.

Figure 7:
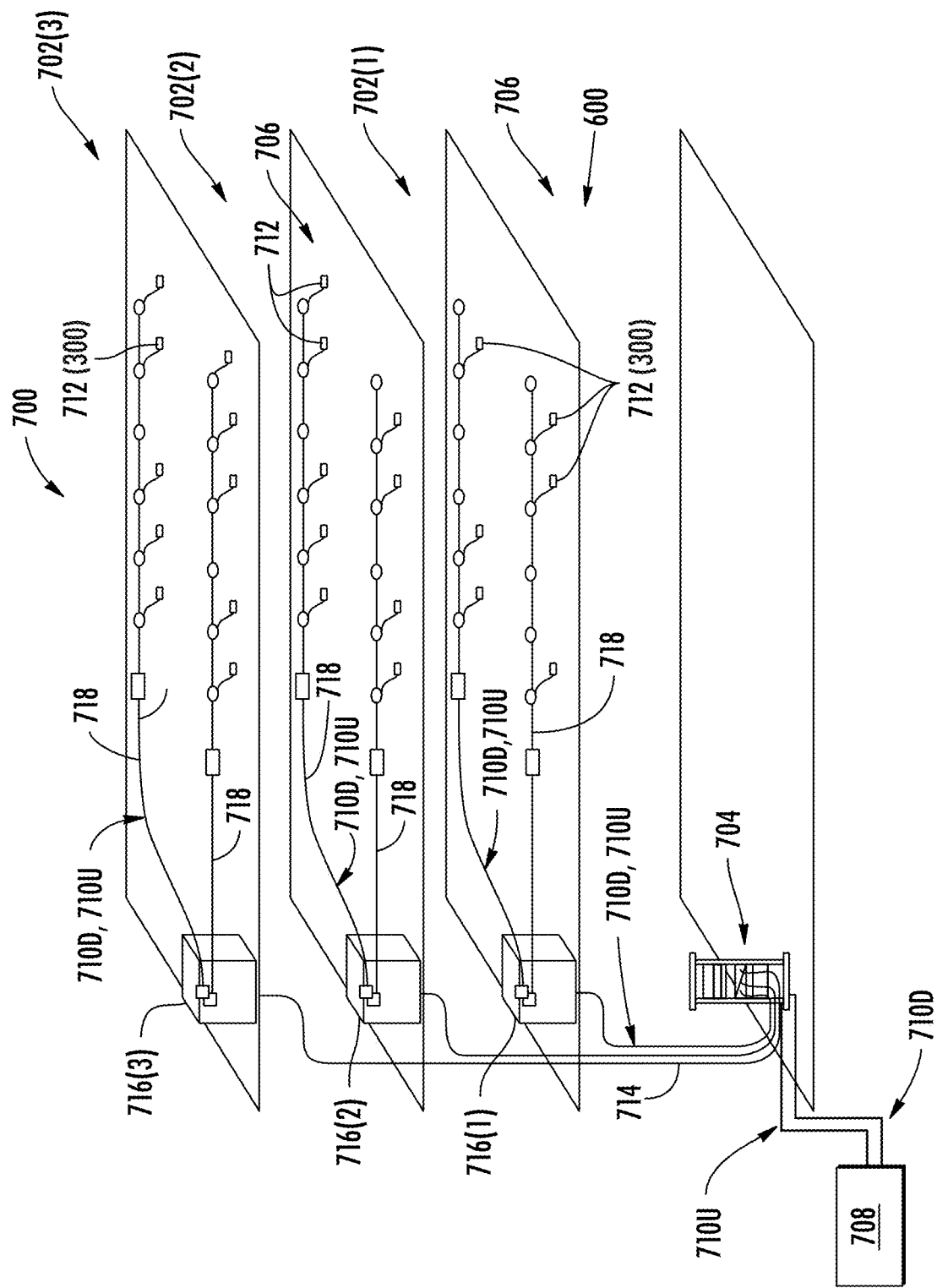
FIG. 7 is a schematic diagram of an exemplary building infrastructure with a deployed DCS, such as the optical fiber-based WDS in FIG. 6.

The WCS 600 in FIG. 6 can be provided in an indoor environment as illustrated in FIG. 7. FIG. 7 is a partial schematic cut-away diagram of an exemplary building infrastructure 700 incorporating the WCS 600 of FIG. 6. The building infrastructure 700 in this embodiment includes a first (ground) floor 702(1), a second floor 702(2), and a third floor 702(3). The floors 702(1)-702(3) are serviced by a central unit 704 to provide antenna coverage areas 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. In a non-limiting example, any of the remote units 712 can be configured to incorporate the wireless communications circuit 300 of FIG. 3 to modify the GoB 304 in response to the coverage condition change in the wireless communications cell 306. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

Figure 8:
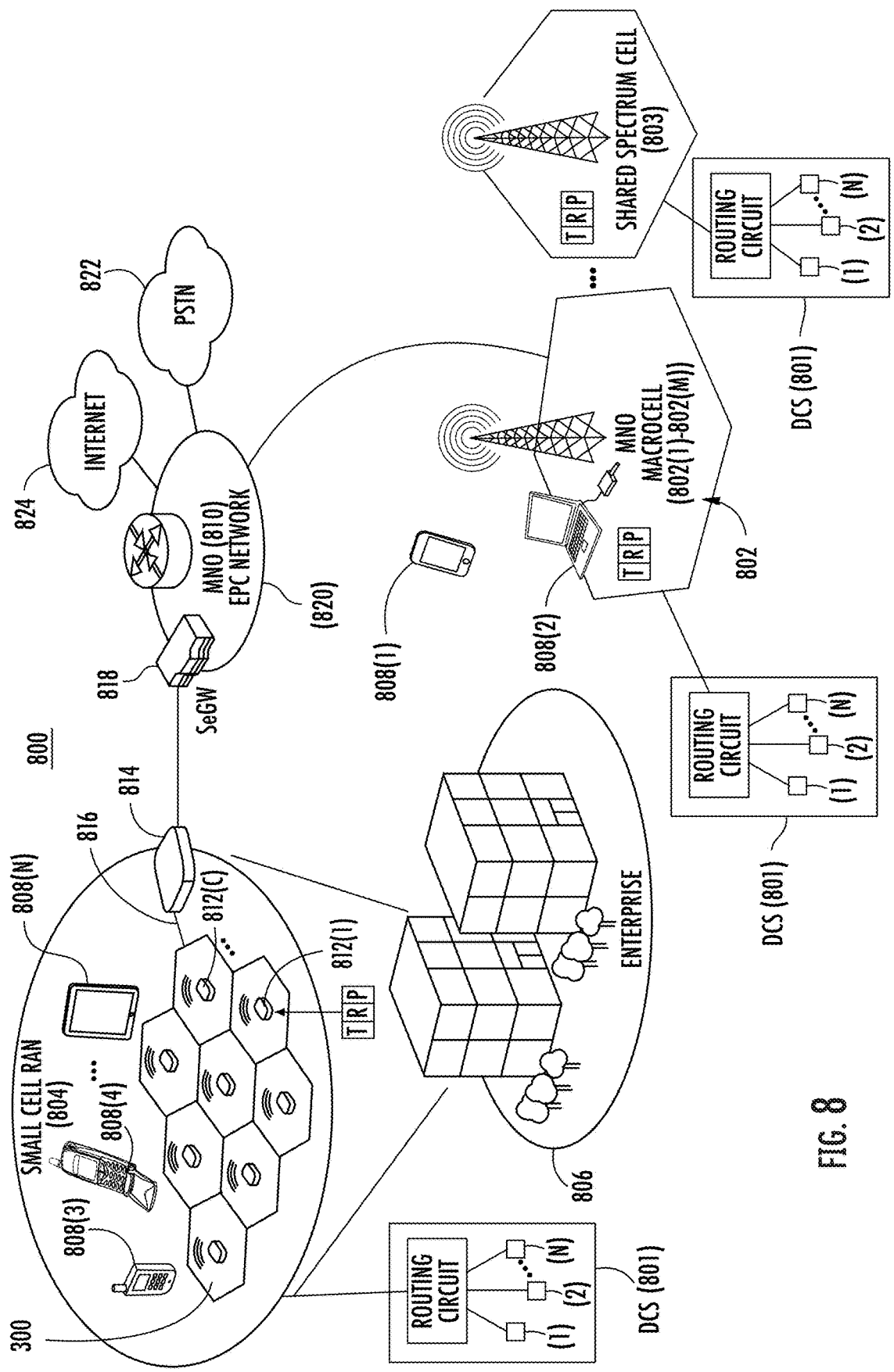
FIG. 8 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment, wherein any of the radio nodes can be configured to incorporate the wireless communications circuit of FIG. 3 to modify the GoB in response to the coverage condition change in the wireless communications cell.

The WCS 600 of FIG. 6, which includes the wireless communications circuit 300 of FIG. 3 to modify the GoB 304 in response to the coverage condition change in the wireless communications cell 306, can also be interfaced with different types of radio nodes of service providers and/or supporting service providers, including macrocell systems, small cell systems, and remote radio heads (RRH) systems, as examples. For example, FIG. 8 is a schematic diagram of an exemplary mobile telecommunications environment 800 (also referred to as "environment 800") that includes radio nodes and cells that may support shared spectrum, such as unlicensed spectrum, and can be interfaced to shared spectrum distributed communications systems (DCSs) 801 supporting coordination of distribution of shared spectrum from multiple service providers to remote units to be distributed to subscriber devices. The shared spectrum DCSs 801 can include the WCS 600 of FIG. 6 as an example.

The environment 800 includes exemplary macrocell RANs 802(1)-802(M) ("macrocells 802(1)-802(M)") and an exemplary small cell RAN 804 located within an enterprise environment 806 and configured to service mobile communications between a user mobile communications device 808(1)-808(N) to a mobile network operator (MNO) 810. A serving RAN for a user mobile communications device 808(1)-808(N) is a RAN or cell in the RAN in which the user mobile communications devices 808(1)-808(N) have an established communications session with the exchange of mobile communications signals for mobile communications. Thus, a serving RAN may also be referred to herein as a serving cell. For example, the user mobile communications devices 808(3)-808(N) in FIG. 8 are being serviced by the small cell RAN 804, whereas user mobile communications devices 808(1) and 808(2) are being serviced by the macrocell 802. The macrocell 802 is an MNO macrocell in this example. However, a shared spectrum RAN 803 (also referred to as "shared spectrum cell 803") includes a macrocell in this example and supports communications on frequencies that are not solely licensed to a particular MNO and thus may service user mobile communications devices 808(1)-808(N) independent of a particular MNO. For example, the shared spectrum cell 803 may be operated by a third party that is not an MNO and wherein the shared spectrum cell 803 supports CBRS. Also, as shown in FIG. 8, the MNO macrocell 802, the shared spectrum cell 803, and/or the small cell RAN 804 can interface with a shared spectrum DCS 801 supporting coordination of distribution of shared spectrum from multiple service providers to remote units to be distributed to subscriber devices. The MNO macrocell 802, the shared spectrum cell 803, and the small cell RAN 804 may be neighboring radio access systems to each other, meaning that some or all can be in proximity to each other such that a user mobile communications device 808(3)-808(N) may be able to be in communications range of two or more of the MNO macrocell 802, the shared spectrum cell 803, and the small cell RAN 804 depending on the location of user mobile communications devices 808(3)-808(N).

In FIG. 8, the mobile telecommunications environment 800 in this example is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 800 includes the enterprise 806 in which the small cell RAN 804 is implemented. The small cell RAN 804 includes a plurality of small cell radio nodes 812(1)-812(C). Each small cell radio node 812(1)-812(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated. In a non-limiting example, each of the small cell radio nodes 812(1)-812(C) can be configured to incorporate the wireless communications circuit 300 of FIG. 3 to modify the GoB 304 in response to the coverage condition change in the wireless communications cell 306.

In FIG. 8, the small cell RAN 804 includes one or more services nodes (represented as a single services node 814) that manage and control the small cell radio nodes 812(1)-812(C). In alternative implementations, the management and control functionality may be incorporated into a radio node, distributed among nodes, or implemented remotely (i.e., using infrastructure external to the small cell RAN 804). The small cell radio nodes 812(1)-812(C) are coupled to the services node 814 over a direct or local area network (LAN) connection 816 as an example, typically using secure IPsec tunnels. The small cell radio nodes 812(1)-812(C) can include multi-operator radio nodes. The services node 814 aggregates voice and data traffic from the small cell radio nodes 812(1)-812(C) and provides connectivity over an IPsec tunnel to a security gateway (SeGW) 818 in a network 820 (e.g, evolved packet core (EPC) network in a 4G network, or 5G Core in a 5G network) of the MNO 810. The network 820 is typically configured to communicate with a public switched telephone network (PSTN) 822 to carry circuit-switched traffic, as well as for communicating with an external packet-switched network such as the Internet 824.

The environment 800 also generally includes a node (e.g., eNodeB or gNodeB) base station, or "macrocell" 802. The radio coverage area of the macrocell 802 is typically much larger than that of a small cell where the extent of coverage often depends on the base station configuration and surrounding geography. Thus, a given user mobile communications device 808(3)-808(N) may achieve connectivity to the network 820 (e.g, EPC network in a 4G network, or 5G Core in a 5G network) through either a macrocell 802 or small cell radio node 812(1)-812(C) in the small cell RAN 804 in the environment 800.

Figure 9:
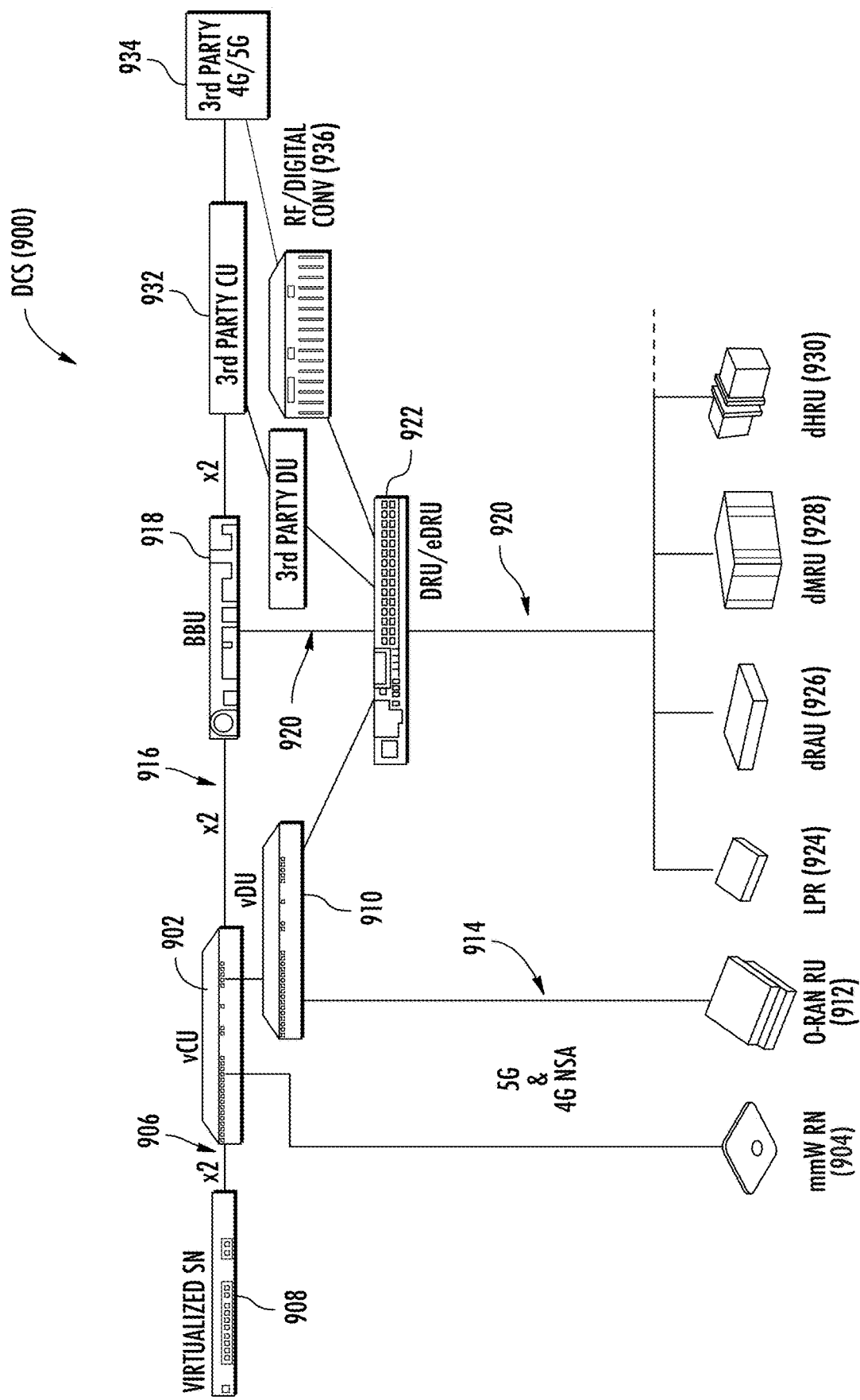
FIG. 9 is a schematic diagram of an exemplary distributed communications system that supports 4G and 5G communications services, and wherein any of the radio nodes can be configured to modify the GoB in response to the coverage condition change in the wireless communications cell.

FIG. 9 is a schematic diagram of another exemplary DCS 900 that supports 4G and 5G communications services, and wherein any of the radio nodes can be configured to provide feedbackless interference estimation and suppression, according to any of the embodiments herein. The DCS 900 supports both legacy 4G LTE, 4G/5G non-standalone (NSA), and 5G communications systems. As shown in FIG. 9, a centralized services node 902, such as the central unit 326 in FIG. 3, is provided that is configured to interface with a core network to exchange communications data and distribute the communications data as radio signals to remote units. In this example, the centralized services node 902 is configured to support distributed communications services to a millimeter wave (mmW) radio node 904. The functions of the centralized services node 902 can be virtualized through an x2 interface 906 to another services node 908. The centralized services node 902 can also include one or more internal radio nodes that are configured to be interfaced with a distribution node 910 to distribute communications signals for the radio nodes to an open RAN (O-RAN) remote unit 912 that is configured to be communicatively coupled through an O-RAN interface 914.

The centralized services node 902 can also be interfaced through an x2 interface 916 to a baseband unit (BBU) 918 that can provide a digital signal source to the centralized services node 902. The BBU 918 is configured to provide a signal source to the centralized services node 902 to provide radio source signals 920 to the O-RAN remote unit 912 as well as to a distributed router unit (DRU) 922 as part of a digital DAS. The DRU 922 is configured to split and distribute the radio source signals 920 to different types of remote units, including a lower power remote unit (LPR) 924, a radio antenna unit (dRAU) 926, a mid-power remote unit (dMRU) 928, and a high power remote unit (dHRU) 930. The BBU 918 is also configured to interface with a third party central unit 932 and/or an analog source 934 through an RF/digital converter 936.

Figure 10:
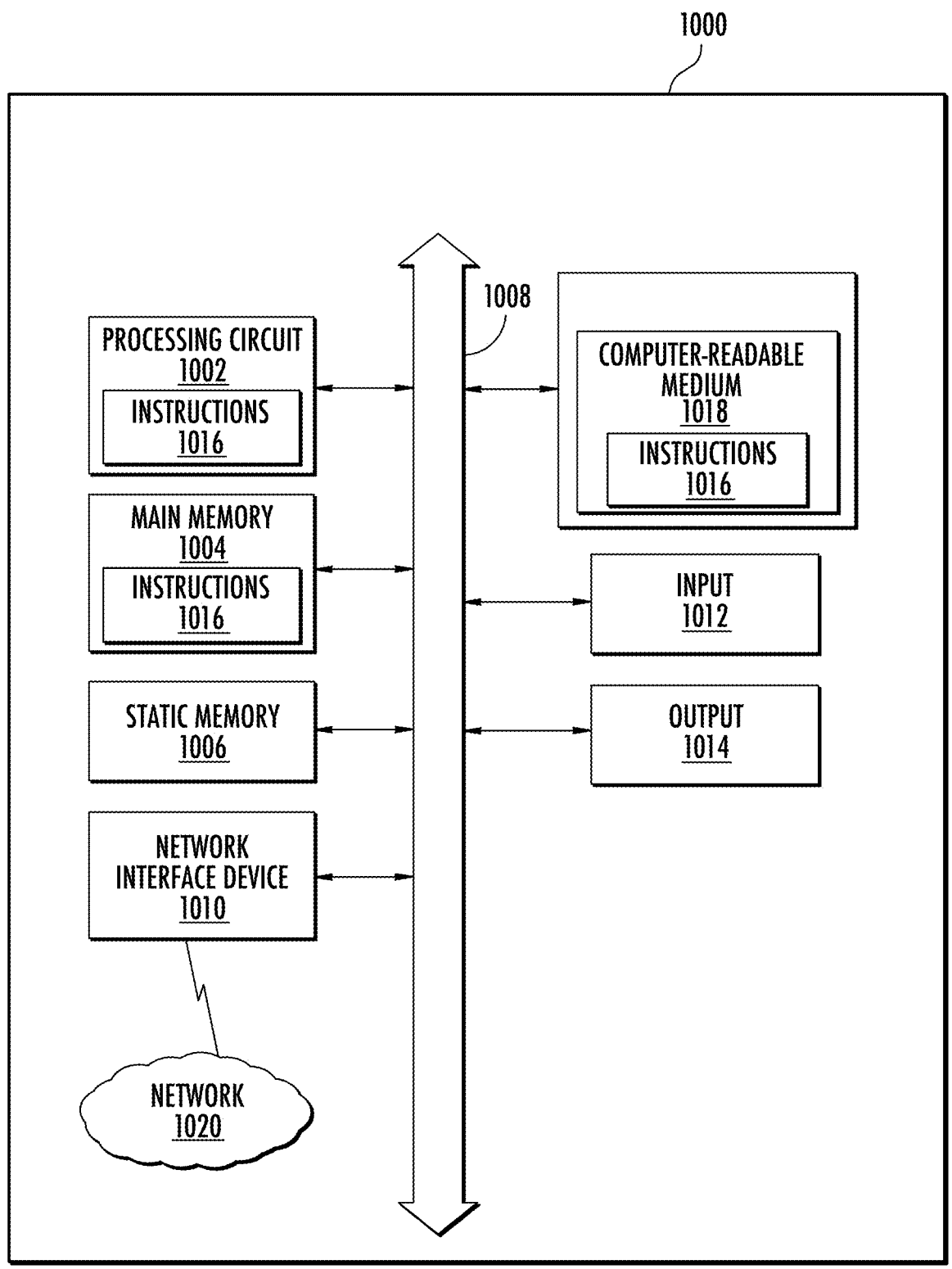
FIG. 10 is a schematic diagram of a representation of an exemplary computer system that can be included in or interface with any of the components in the wireless communications circuit of FIG. 3, wherein the exemplary computer system is configured to execute instructions from an exemplary computer-readable medium to modify the GoB in response to the coverage condition change in the wireless communications cell.

Any of the circuits in the wireless communications circuit 300 of FIG. 3 (e.g., the control circuit 314) can include a computer system 1000, such as shown in FIG. 10, to modify the GoB 304 in response to the coverage condition change in the wireless communications cell 306. With reference to FIG. 10, the computer system 1000 includes a set of instructions for causing the multi-operator radio node component(s) to provide its designed functionality, and their circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1000 in this embodiment includes a processing circuit or processor 1002, a main memory 1004 (e.g., read-only memory (ROM), flash memory, dynamic random access memory (DRAM) such as synchronous DRAM (SDRAM), etc.), and a static memory 1006 (e.g., flash memory, static random access memory (SRAM), etc.), which may communicate with each other via a data bus 1008. Alternatively, the processing circuit 1002 may be connected to the main memory 1004 and/or static memory 1006 directly or via some other connectivity means. The processing circuit 1002 may be a controller, and the main memory 1004 or static memory 1006 may be any type of memory.

The processing circuit 1002 represents one or more general-purpose processing circuits such as a microprocessor, central processing unit, or the like. More particularly, the processing circuit 1002 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1002 is configured to execute processing logic in instructions 1016 for performing the operations and steps discussed herein.

The computer system 1000 may further include a network interface device 1010. The computer system 1000 also may or may not include an input 1012 to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processing circuit 1002 during execution thereof by the computer system 1000, the main memory 1004 and the processing circuit 1002 also constituting computer-readable medium. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless communications system (WCS), comprising:
   a plurality of remote units coupled to a plurality of communications mediums, the plurality of remote units configured to:
      receive a plurality of downlink digital communications signals via the plurality of communications mediums, respectively;
      convert the plurality of downlink digital communications signals into a plurality of downlink radio frequency (RF) communications signals, respectively;
      distribute the plurality of downlink RF communications signals, respectively;
      receive a plurality of uplink RF communications signals, respectively;
      convert the plurality of uplink RF communications signals into a plurality of uplink digital communications signals, respectively; and
      provide the plurality of uplink digital communications signals via the plurality of communications mediums, respectively;
   wherein at least one remote unit among the plurality of remote units comprises:
      an antenna array comprising a plurality of radiating elements configured to radiate a grid of beams (GoB) comprising a plurality of RF beams corresponding to an RF communications signal among the plurality of downlink RF communications signals in a wireless communications cell; and
      a control circuit configured to:
         receive first indication signal indicative of a short-term coverage condition change in the wireless communications cell and a second indication signal indicative of a long-term coverage condition change in the wireless communication cell; and
         cause the antenna array to modify the GoB in response to the short-term coverage condition change and the long-term coverage condition change.

2. The WCS of claim 1, wherein the control circuit is configured to cause the antenna array to modify the GoB to change a beamwidth of a selected RF beam among the plurality of RF beams.

3. The WCS of claim 2, wherein the at least one remote unit further comprises a beamformer circuit configured to receive a plurality of beam weight sets corresponding to the plurality of RF beams, respectively, from the control circuit.

4. The WCS of claim 3, wherein the beamformer circuit is further configured to process the RF communications signal based on each of the plurality of beam weight sets to generate a plurality of weighted RF communications signals corresponding to the plurality of radiating elements, respectively.

5. The WCS of claim 2, wherein the at least one remote unit further comprises a signal processing circuit configured to:
   determine the short-term coverage condition change in the wireless communications cell based on at least one coverage indication parameter; and
   generate the first indication signal indicative of the short-term coverage condition change in the wireless communications cell.

6. The WCS of claim 1, wherein the control circuit is configured to cause the antenna array to modify the GoB to combine at least two RF beams among the plurality of RF beams.

7. The WCS of claim 6, wherein the at least one remote unit further comprises a beamformer circuit configured to receive a plurality of beam weight sets corresponding to the plurality of RF beams, respectively, from the control circuit.

8. The WCS of claim 7, wherein the beamformer circuit is further configured to process the RF communications signal based on each of the plurality of beam weight sets to generate a plurality of weighted RF communications signals corresponding to the plurality of radiating elements, respectively.

9. The WCS of claim 6, wherein the at least one remote unit further comprises a signal processing circuit configured to:
   determine the short-term coverage condition change in the wireless communications cell based on at least one coverage indication parameter; and
   generate the first indication signal indicative of the short-term coverage condition change in the wireless communications cell.

10. The WCS of claim 1, wherein the control circuit is further configured to cause the antenna array to modify the GoB to eliminate a selected RF beam.

11. The WCS of claim 10, wherein the at least one remote unit further comprises a beamformer circuit configured to receive a plurality of beam weight sets corresponding to the plurality of RF beams, respectively, from the control circuit.

12. The WCS of claim 11, wherein the beamformer circuit is further configured to process the RF communications signal based on each of the plurality of beam weight sets to generate a plurality of weighted RF communications signals corresponding to the plurality of radiating elements, respectively.

13. The WCS of claim 10, wherein the at least one remote unit further comprises a signal processing circuit configured to:
   determine the short-term coverage condition change in the wireless communications cell based on at least one coverage indication parameter; and
   generate the first indication signal indicative of the short-term coverage condition change in the wireless communications cell.

14. A wireless communications system (WCS), comprising:
   a plurality of remote units coupled to a plurality of communications mediums, the plurality of remote units configured to:
      receive a plurality of downlink digital communications signals via the plurality of communications mediums, respectively;
      convert the plurality of downlink digital communications signals into a plurality of downlink radio frequency (RF) communications signals, respectively;
      distribute the plurality of downlink RF communications signals, respectively;
      receive a plurality of uplink RF communications signals, respectively;
      convert the plurality of uplink RF communications signals into a plurality of uplink digital communications signals, respectively; and
      provide the plurality of uplink digital communications signals via the plurality of communications mediums, respectively;

wherein at least one remote unit among the plurality of remote units comprises:
   an antenna array comprising a at least one radiating element configured to radiate a grid of beams (GoB) comprising a plurality of RF beams corresponding to an RF communications signal among the plurality of downlink RF communications signals in a wireless communications cell; and
   a control circuit configured to:
      receive a first indication signal indicative of a short-term coverage condition change in the wireless communications cell and a second indication signal indicative of a long-term coverage condition change in the wireless communication cell; and
      cause the antenna array to modify the GoB in response to the short-term coverage condition change and the long-term coverage condition change in the wireless communications cell.

15. The WCS of claim 14, wherein the at least one remote unit further comprises a signal processing circuit configured to determine the coverage condition change in the wireless communications cell based on at least one coverage indication parameter.

16. The WCS of claim 15, wherein the signal processing circuit is further configured to generate the indication signal indicative of the coverage condition change in the wireless communications cell.

17. The WCS of claim 16, wherein the signal processing circuit is further configured to determine the coverage condition change in the wireless communications cell based on the at least one coverage indication parameter selected from the group consisting of: a reference signal received power (RSRP) measurement, a user equipment (UE) count, a resource usage indicator, and a UE timing advance indicator.

* * * * *